United States Patent [19]

Shire et al.

[11] 3,727,951

[45] Apr. 17, 1973

[54] CONNECTOR CLAMP

[75] Inventors: Harold Shire, Beverly Hills; Ira R. Newman, Lakeview Terrace; Robert S. Allison, San Gabriel, all of Calif.

[73] Assignee: General Connectors Corporation, Burbank, Calif.

[22] Filed: Feb. 17, 1972

[21] Appl. No.: 201,379

Related U.S. Application Data

[62] Division of Ser. No. 886,492, Dec. 19, 1969.

[52] U.S. Cl. .....................285/93, 285/367, 285/369
[51] Int. Cl..............................................F16l 55/00
[58] Field of Search.....................285/331, 363, 367, 285/369, 404, 407, 345, 365, 366, 410, 417, 223, 412, 93

[56] References Cited

UNITED STATES PATENTS

| | | | |
|---|---|---|---|
| 2,464,466 | 3/1949 | Stout | 285/404 X |
| 1,197,813 | 9/1916 | Frilick | 285/410 X |
| 1,331,715 | 2/1920 | Lindfors | 285/369 X |
| 1,991,343 | 2/1935 | Ball | 285/331 X |
| 2,456,048 | 12/1948 | Carpenter | 285/417 X |
| 3,379,460 | 4/1968 | Allyn | 285/331 X |

Primary Examiner—Dennis L. Taylor
Attorney—Julius L. Rubinstein

[57] ABSTRACT

The invention is a generally cylindrical split ring adapted to tightly embrace a thin-walled tube. The ends of the clamp have constricting means for decreasing the diameter of a split ring in order to cause it to tightly embrace the tube. The split ring is provided with a plurality of integrally attached channel shaped combined claws and legs designed to grasp the ribs of a slip joint connector whereby the thin-walled tube and slip joint connector are releasably held in longitudinally fixed relationship. The combined claws and legs have a spacing function in that when the combined claws and legs engage a support or abutting surface, the cylindrical split ring of the clamp is held parallel to the support surface at a distance from the support surface equal to the distance from the end of the thin-walled tube where the cylindrical split ring must be secured. In this way, if the thin-walled tube is inserted through the split ring until its end abuts the support surface, the cylindrical split ring will be at the correct place on the thin-walled tube.

5 Claims, 8 Drawing Figures

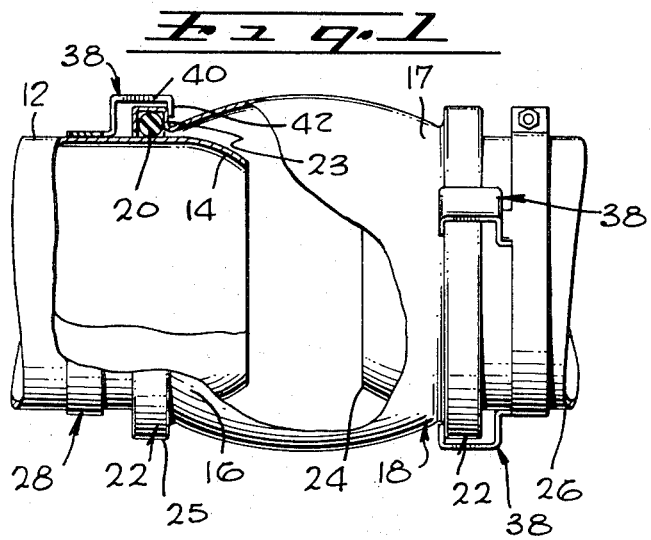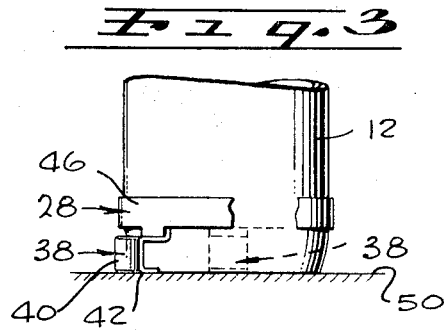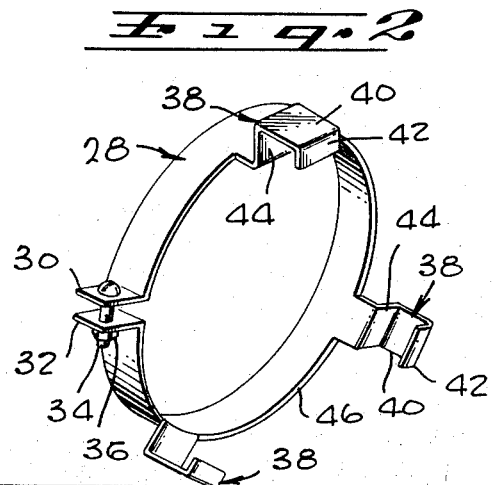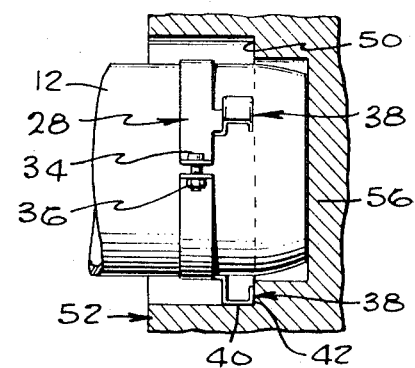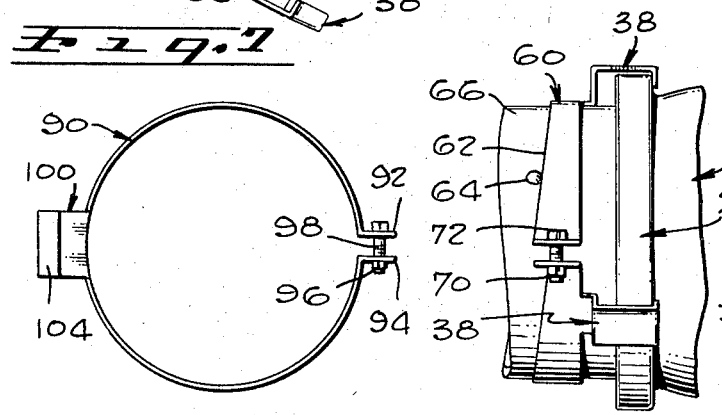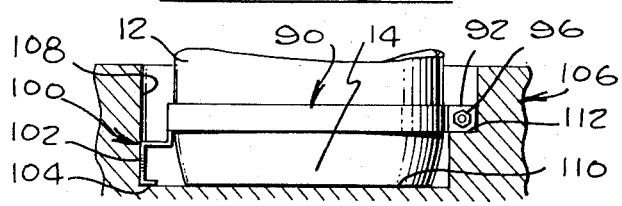
HAROLD SHIRE
IRA R. NEWMAN
ROBERT S. ALLISON
INVENTORS
BY Julius L. Rubinstein
ATTORNEY

CONNECTOR CLAMP

This invention is a divisional and continuation in part application filed pursuant to a requirement for restriction in patent application Ser. No. 886,492 filed Dec. 19, 1969.

This invention relates generally to a connecting device, and more particularly to a clamp for use with slip joint connectors.

BRIEF SUMMARY

Heretofore, flexible seal connectors comprised an annular coupling sleeve or slip joint connector, which had a generally radially projecting, rib shaped, integrally formed, seal ring receiving channel on at least one end. The central portion of the coupling sleeve extended radially outwardly from at least one end to provide a flexible fluid tight connection.

Thin-walled tubes penetrated the ends of the coupling sleeve and in order to hold the thin-walled tubes and coupling sleeve in fixed relationship against tension, one end of a resilient arm was spot welded to the tube. This arm terminated in an inverted claw which fit over the radially projecting rib shaped channel formed on the end of the coupling sleeve.

However, these coupling sleeves are frequently used in aircraft, and the structure often must be disconnected from the thin-wall tube by maintenance personnel doing repair work on the airplane. The frequent disconnection of the coupling sleeve caused repeated flexing of the resilient arm which eventually resulted in failure of the spot weld connection. When this happened, some delay was caused by the necessity of finding another spot on the circumference on the thin-wall tube which had not been previously spot welded, and then the arm had to be spot welded to this portion of the wall of the tube. The flexible arm always had to be spot welded at substantially the same distance from the end of the tube in order for the facing ends of the tubular pipes or conduits to extend inside the coupling sleeve connector a distance sufficient to prevent leakage and/or accidental separation under tension. Consequently, the resilient arm could only be reattached to the tube a limited number of times before the entire tube had to be replaced.

If the arm of the claw could be releasably held in a fixed position on the thin-walled tube at a predetermined distance from its end without spot welding, this problem could be eliminated. What is needed, therefore, and comprises an important object of this invention, is to provide a clamp with arms and claws integrally attached for releasably embracing a thin-walled tube.

Another object of this invention is to provide means for releasably securing a clamp with claws a predetermined distance from the end of a thin-walled tube.

Still a further object of this invention is to provide a ring-shaped clamp having a plurality of combined claws and legs shaped so that the clamp can rest on a support or abutting surface with the combined legs and claws holding the annular ring of the clamp parallel to the support surface at a distance above the support surface equal to the distance from the end of the thin-walled tube where the clamp must be fastened.

Yet another object of this invention is to provide a ring-shaped clamp having combined claws and legs which can be easily secured to the surface of the thin-walled tube at a fixed distance from its end.

These and other objects of this invention will become more apparent when better understood in the light of the specification and accompanying drawings wherein:

FIG. 1 discloses an elevational view of thin-walled tubes extending in opposite sides of a coupling sleeve and showing the ring-shaped clamp secured to the ends of the thin-walled tubes with the combined claws and legs grasping radially projecting ribs on the end of the coupling sleeve.

FIG. 2 is a perspective view of the ring-shaped clamp showing the combined claws and legs.

FIG. 3 discloses the ring-shaped clamp with the combined claws and legs resting on a horizontal support surface and holding the ring of the clamp a distance above the horizontal support surface equal to the distance from the end of the thin-walled tube where the clamp must be attached.

FIG. 4 discloses the ring-shaped clamp held in a jig with the feet of the combined claws and legs abutting a base surface of a cylindrical recess formed in the jig while the end of the tube engages a reference surface in the jig for positioning the ring of the clamp at the required distance from the end of the tube FIG. 3.

FIG. 5 discloses a modified ring-shaped clamp with an edge of the clamp cut on the bias to serve as a cam so the ring-shaped clamp may be moved linearly along the surface of a thin-walled tube.

FIG. 6 discloses another modification of the annular ring-shaped clamp wherein the clamp has only two diametrically opposed combined claws and legs shaped to hold the split ring of the clamp in a stable position parallel to a support surface when the feet of the legs abut the support surface.

FIG. 7 discloses still another modification of the annular ring-shaped clamp showing the clamp with only one combined claw and leg, shaped to cooperate with the jig in holding the split ring of the clamp parallel to a support surface.

FIG. 8 discloses the modified clamp shown in FIG. 7 mounted in a jig.

Referring now to FIG. 1 of the drawing, the free end 14 of the thin-walled tube 12 penetrates the end portion 16 of the coupling sleeve 18 with the periphery of tube 12 in sealing and pivoting engagement with a seal 20. As shown in FIG. 1, seals 20 are positioned inside of an internally open outwardly projecting rib-shaped channel 22 formed at the end portions 16 and 17 of the coupling sleeve 18. Seal 20 is shaped so its sealing capacity increases with increasing internal tube pressure and/or temperature.

The end portion 24 of another thin-walled tube 26 penetrates the end portion 17 of a coupling sleeve 18. The tapered ends of the coupling sleeve 18 permit the thin-walled tubes 12 and 26 to flex substantially in relationship to each other to accommodate vibration caused by operation of the airplane or other vehicle in which the connecting tubes and coupling sleeve are mounted. It is also apparent that if the seal rings 20 are thick enough some limited flexure would be permitted by the engagement between the seal rings and the surface of the thin-walled tubes.

A generally cylindrical split clamp ring 28 embraces the end portion 14 and 24 of tubes 12 and 26, See FIG. 1. The split ends 30 and 32 of clamp ring 28 are flanged radially outwardly, See FIG. 2. These ends are provided with aligned bolt receiving hole through which a bolt 34 extends. A nut 36 is mounted on this bolt as shown. With this arrangement, as nut 36 is tightened on to bolt 34, the diameter of the clamp ring 28 is decreased so that the clamp ring may be tightened on the periphery of the tubes 12 and 26.

In the particular embodiment shown, the clamp ring 28 is provided with three integrally attached combined claws and legs 38 disposed in equally spaced angular relation around the periphery of the clamp ring. In this particular embodiment, the combined claws and legs are generally channel shaped in cross-sections and include a leg portion 40 with transverse feet portions 42 at the free end. The legs 40 are attached to the annular split ring 46 of the clamp by means of flanges 44 which position the legs 40 and feet 42 in radially outwardly spaced relation to the periphery of the ring 28.

In assembled relation, as best seen in FIG. 1, the combined claws and legs 38 fit over the rib-shaped channels 22 on the coupling sleeve and when tension exists between the thin-walled tube and the coupling sleeve, feet 42 of the claws bear against the walls 23 of the rib-shaped channels to limit and prevent separation between the coupling sleeve and the tube while permitting flexure between the thin-walled tubes and the coupling sleeve. As shown in FIG. 1, this requires that the legs 40 be longer than the web 25 of the rib-shaped channels 22.

It is contemplated that the coupling sleeve and the thin-walled tube be used for the transmission of gases at high temperatures and in air-conditioning ducts in aircraft. To prevent leakage of these gases, it is necessary that the end portions of the thin-walled tube penetrate a sufficient distance inside the coupling sleeve. This in turn requires the clamp ring 28 to be positioned at a predetermined distance from the ends of the thin-walled tubes when the claws 38 fit over the rib-shaped channels 22.

The clamp ring can be positioned on the thin-walled tube by a painting or scribing marks on the surface of the tube. However, long continued use plus the heat of the gases passing through the tube could destroy the marks so that the clamps may not be properly positioned on the tube for adequate penetration of the end portions 14 and 24 inside the coupling sleeve 18. Although the correct position of the annular clamp can always be determined by means of simple measuring devices, carelessness of the assembler can introduce the possibility of error which in the case of modern aircraft could be catastrophic.

To make the correct positioning of the clamp ring as rapid and as fool proof as possible, advantage is taken of the configuration of the clamp ring shown in FIG. 2. In this configuration the feet 42 of the combined claws and legs are all in the same plane, and the legs 40 are all the same length. Consequently, as shown in FIG. 3, the clamping ring 28 can rest on a horizontal reference and support surface supported by legs 40 and feet 42, and the split ring 46 of the clamp 28 will be disposed in a stable horizontal position above the reference and support surface 50. If the length of the legs 40 and flanges 44 are properly selected, the split ring will be held above the reference and support surface 50 the required distance from the end of the thin-walled tube where the split clamp ring must be secured. With this arrangement, when the end 14 of tube 12 is inserted through the ring until the end 14 abuts the support surface 50 as shown in FIG. 3, and the nuts and bolts 34 and 36 are tightened, the split clamp ring will be at be the correct distance from the end of the tube.

In situations where the thin-walled tube, e.g., tube 12, is horizontal and is in a position where the remote end of tube 12 is mounted in some inaccessible spot, a jig 52, See FIG. 4, can be formed with a transverse bore 54 sized to snugly but releasably hold the legs 40 of the combined claws and legs 38. In this way, if a jig 52 is held in a vertical position, the axis of the annular ring-shaped clamp inserted inside the jig would be in a horizontal position. If the annular clamp is inserted in the jig until the feet 42 abut reference and support surface 50, then if the jig 52 holding the split ring clamp is moved so the free end portion 14 of tube 12 moves through the ring until it abuts the reference and support sur-face 50, the split ring clamp would be properly positioned at the required distance from the end 14 of the tube 12.

Under some circumstances, as when the pressure carried by the tubes 12 and 26 is higher, it might be necessary for the tube to penetrate a greater distance inside the coupling sleeve 18. This would require the split ring clamp to be secured a greater distance from the ends of the tube. In such a situation, in assembled relation, the end of the tube will not be in the same plane as the plane of the feet 42, see FIG. 1. To do this, jig 52 is provided with a counterbore 55. This counterbore would have a reference surface 56 and if the reference surface 56 were selected so its distance from support surface 50 is correct, then when the end 14 of the thin-walled tube 12 is inserted through the split ring clamp 38 until the end 14 of the tube abuts the reference surface 56, the clamp ring 38 will be on the tube at the distance from the end 14 of the tube 12 required by the higher pressure carried by the tube. While the split ring clamp is in the jig, its position could be temporarily marked by means of a scribe until the tube 12 and the clamp 38 are removed from the jig. If desired, the feet of the legs could be magnetized to hold the clamp to a vertical metallic support surface, if the jig 52 is disposed to receive horizontal pipes.

In the embodiment shown in FIG. 5, the modified split ring clamp 60 has an edge 62 cut at a bias. If a protuberance 64 is formed on the end of the tube 66 as shown, then linear adjustment of the clamp ring 60 along tube 66 is possible by rotating the clamp ring 60 with the bias cut edge 62 bearing against protuberance 64 when the nuts and bolts 70 and 72 are loose.

To this point, the principles of this invention have bee shown with the split ring clamp having three combined claws and legs. It is also possible to practice the principles of this invention with only two combined claws and legs as shown in FIG. 6. It is only necessary that the legs and feet 80 of the clamp ring 82 be shaped to hold the clamp ring 82 in a stable position parallel to a surface as shown in FIGS. 3 and 4.

The invention may also be practiced with a single combined claw and leg in combination with a suitable jig as shown in FIGS. 7 and 8. The clamp split ring 90 has flanged radially outwardly projecting split ends 92 and 94. These flanged ends are provided with aligned holes for receiving the nut and bolt 96 and 98, as described above. Generally, diametrically opposite the split end is located a combined claw and leg 100 with a leg portion 102 and feet portion 104. A jig 106 has a bore 108, and the bore is provided with a base support portion 110. A small arcuate support step 112 extends upward from the base portion 110, and this support step is designed to support the lower edge of the flanged end 92 and 94 and in combination with the combined foot and claw 100 holds the split clamp ring 90 in a stable position parallel to the base support surface 110. With this arrangement, if the length of the leg 102 of the combined claw and leg is properly selected, the split clamp ring 90 will be at a distance from the surface 110 equal to the distance that clamp 90 must be from the end 14 of the tube 12. With this arrangement the end 14 of the tube 12 can be moved through the clamp ring 90 until the end 14 abuts the base of support surface 110 to locate the position of the clamp ring on the end of the tube.

Having described the invention, what is claimed is:

1. A clamp for attachment to a tube comprising a ring, means for causing said ring to tighten and embrace a tube, said clamp having combined means thereon for holding the ring in stable position over a support surface at a distance from the support surface related to the distance from the end of the tube where the clamp must be attached and for engaging a portion of a coupling member, said combined means comprising at least one longitudinally extending channel-shaped member integrally secured thereon and serving as a combined claw and spacer member, said channel-shaped member including an inner radially outwardly extending wall portion, a longitudinally extending web portion, and a planar radially inwardly extending wall portion secured to the remote end of the web portion, the web of a channel-shaped member serving as a spacer leg and the planar radially inwardly extending outer wall portion serving as a foot, the plane of the surface of the foot transverse to the axis of the ring, means co-acting with said foot so that if the cylindrical ring is positioned so the foot engages a planar support surface the cylindrical split ring will be held in a stable position parallel to the support surface, the length of the web of the channel-shaped member selected so it is related to the distance from the end of the tube where the clamp must be attached.

2. A clamp for attachment to a tube comprising a cylindrical split ring, adjacent edges of the cylindrical split ring extending radially outwardly to define flanges, an aligned opening extending through said radially projecting flanges whereby when a bolt is inserted through said aligned openings and a nut is tightened on the bolt, the diameter of the cylindrical split ring decreases so it can tighten and embrace the outer surface of the tube, said clamp having combined means thereof for holding the cylindrical split ring in a stable position over a support surface at a distance from the support surface related to the distance from the end of the tube where the clamp must be secured and for engaging a portion of a coupling member, said combined means comprising three identical longitudinally extending channel-shaped members integrally secured thereto in equal angularly spaced relation around the periphery of the split ring and serving as combined claws and gauge members, each channel-shaped member including an inner radially outwardly extending wall portion, a longitudinally extending web portion, and a planar radially inwardly extending outer wall portion secured to the remote end of the web portion, the web portions of each channel-shaped member serving as spacer legs and the planar radially inwardly extending outer wall portions serving as feet, the plane of the surface of the feet transverse to the axis of a cylindrical ring and in a common plane so that if the cylindrical split ring is positioned so the feet engage a planar support surface, the cylindrical split ring will be held in a stable position parallel to the support surface, the length of the web of the channel-shaped member selected so it is related to the distance from the end of the tube where the clamp must be attached.

3. The clamp described in claim 1. wherein the clamp ring has two identically shaped claw-like longitudinally extending channel shaped members secured thereto on diametrically opposite sides of said clamp ring, the feet of said channel shaped member in a common plane and having sufficient area to hold the clamp ring in a stable position parallel to a support surface when the feet of said clamp engage the support surface.

4. The clamp described in claim 1. wherein the clamp ring has three identically shaped claw-like longitudinally extending channel shaped members secured thereto in equal angularly spaced relationship around the periphery of the clamp ring. the feet of said channel shaped members in a common plane to hold the clamp ring in a stable position parallel to a support surface when the feet of said clamp engages the support surface.

5. The clamp described in claim 4. where its feet of said channel shaped members are magnetic and hold the clamp ring to a vertical metallic surface.

* * * * *